(12) United States Patent
Srinivasan

(10) Patent No.: US 6,907,449 B2
(45) Date of Patent: Jun. 14, 2005

(54) CONFERENCING SYSTEM FOR SIMULTANEOUS BROADCAST OF AUDIO AND TRANSMISSION OF DOCUMENTS VIA PUSH TECHNOLOGY

(75) Inventor: Thiru Srinivasan, Highland Ranch, CO (US)

(73) Assignee: Qwest Communications International, Inc., Denver, CO (US)

(*) Notice: Subject to any disclaimer, the term of this patent is extended or adjusted under 35 U.S.C. 154(b) by 0 days.

(21) Appl. No.: 09/158,394

(22) Filed: Sep. 22, 1998

(65) Prior Publication Data

US 2001/0023430 A1 Sep. 20, 2001

(51) Int. Cl.[7] .............................. G06F 15/16; G09G 5/00
(52) U.S. Cl. ...................... 709/204; 709/217; 709/218; 709/219; 345/753; 345/755
(58) Field of Search ..................... 709/204, 217–219, 709/228, 232, 249, 250, 206; 345/753, 755, 335, 348, 349, 966, 972, 977, 978, 733, 734–748; 379/88.13, 93.02, 93.03, 93.04, 95, 100.13, 93.21, 93.24, 158, 202, 900–908; 707/523, 513

(56) References Cited

U.S. PATENT DOCUMENTS

| | | | | | |
|---|---|---|---|---|---|
| 5,710,883 A | * | 1/1998 | Hong et al. | ................. | 709/206 |
| 5,781,901 A | * | 7/1998 | Kuzma | ......................... | 707/10 |
| 5,862,325 A | * | 1/1999 | Reed et al. | .................. | 709/201 |
| 5,864,604 A | * | 1/1999 | Moen et al. | .................. | 379/88 |
| 5,884,262 A | * | 3/1999 | Wise et al. | .................. | 704/270 |
| 5,896,500 A | * | 4/1999 | Ludwig et al. | ............. | 370/261 |
| 5,907,598 A | * | 5/1999 | Mandalia et al. | ...... | 379/100.01 |
| 5,915,091 A | * | 6/1999 | Ludwig et al. | ............. | 370/265 |
| 5,916,302 A | * | 6/1999 | Dunn et al. | .................. | 709/204 |
| 5,953,322 A | * | 9/1999 | Kimball | ....................... | 370/328 |
| 5,953,392 A | * | 9/1999 | Rhie et al. | ............... | 379/88.13 |
| 5,974,449 A | * | 10/1999 | Chang et al. | ................ | 709/206 |
| 6,009,462 A | * | 12/1999 | Birrell et al. | ................ | 709/206 |
| 6,065,048 A | * | 5/2000 | Higley | ........................ | 709/218 |
| 6,161,149 A | * | 12/2000 | Achacoso et al. | ............. | 710/4 |
| 6,237,040 B1 | * | 5/2001 | Tada | ........................... | 709/246 |
| 6,343,313 B1 | * | 1/2002 | Salesky et al. | ............. | 709/204 |

OTHER PUBLICATIONS

Ref B: Newton's Telecom Dictionary, Newton, H., Flatiron Publishing, 14th Expanded and Updated Ed., Mar., 1998, see plug–ins.*

(Continued)

*Primary Examiner*—Beatriz Prieto
(74) *Attorney, Agent, or Firm*—Robert G. Crouch; Marsh Fischmann & Breyfogle LLP

(57) ABSTRACT

A conferencing system provides for the simultaneous processing of audio and document information during a conference call. An audio conferencing bridge includes the functionality to provide an audio connection between attendees who have dialed into the bridge through either the Public Switch Telephone Network or over a data network using IP telephony. Each of the meeting attendees has access to a user interface with a connection to a data network. On each user interface is a web browser which includes a specially designed plug-in for converting documents from traditional word processing or database formats to HTML. A list is compiled in the conferencing bridge which includes the names and IP addresses for each of the attendees. Once the plug-in has converted the documents to HTML format, a series of icons are incorporated into the documents which provide for the transmission of this information to the other parties. At the time a party wishes to broadcast this information to the others, it is first transmitted via an e-mail to the conferencing bridge which accesses a list of attendees. Using PUSH technology, the documents are transmitted via the data network to the web browsers of all the other attendees. The specially designed plug-in allows each conference attendee to broadcast documents to all other attendees.

13 Claims, 5 Drawing Sheets

OTHER PUBLICATIONS

Development of multimedia E-mail system providing an integrated message view, Sch-Joon Dokko; Sung-Hyun Yun; Tai-Yun Kim; High Performance Computing on the Information Superhighway providing an integrated message view, Apr. 28, 1997. HPC on pp. 494-498.*

Internet Business Opportunities, Machover, C.; Computer Graphics International, Jun. 23-27, 1997, on pp. 138-143.*

Salamander: A Push based Distribution substrate for Internet Application, Malan, G.R.; Jahanian, F.; Subramanian, S., University of Michigan, Proceedings of the USENIX Symposium on Internet Technologies and Systems, California, Dec. 1997, pp. 1-12.*

IBM Journal of Research and Development, Bisdikian, et al.; Multimedia Digital Conferencing: A Web-enabled multimedia teleconferencing system, vol. 42, No. 2, pp. 281-298, published Mar. 1998.*

Computer-Networks and ISDN Systems; Web Canal: a Multicast Web Application, Liao, T.; vol. 29, No. 8-12, pp. 1091-1102, published Sep. 1997.*

Web authoring gets easier, CommunicationsWeek, by Frook, J.E., ISSN 0748-8121, Oct. 28, 1996, p. 47. (Microsoft Corp i to make available FrontPage 97 on its Web site; product addresses needs of businesses wanting to distribute low-cost authorin too.*

Automatic HTML Conversions, CommunicationsWeek, ISSN: 0748-8121, Nov. 4, 1996, p. 46.*

Push battle breaks out as Netscape launches Netscaster in head-to-head with Microsoft, Computergram International, n3412 from ComputerWire, Inc., ISSN: 0268-716X, Apr. 17, 1997, p. 1.*

Beyond browsing, Netscape Communicator 4.0 unites the enterprise, ComputerWorld by Millman, H. v31n31, ISSN 0010-4841 Aug. 4, 1997, p. 71-72.*

Internet viewer overtakes desktop, becomes all browser, all the time, Computer Reseller News, Elgar, E; Shore, J., ISSN: 0893 8377, Mar. 17, 1997, p. 3-8.*

Microsoft Internet Explorer 4.0 in Beta for Developers, Newsbytes News Network, Apr. 9, 1997.*

HTML add-ons bring the power of the Internet to Word for Windows, Mendelson, E., PC Magazine, 14v, n11, p37(2).*

* cited by examiner

| Attendees' Names | IP Address |
|---|---|
| Smith, John | 696.892.156 |
| Cook, Edward | 243.863.752 |
| Dunn, Julie | 542.721.811 |
| Hall, Jim | 676.491.552 |
| Costello, Roberta | 442.866.991 |

Fig. 5

CONFERENCING SYSTEM FOR SIMULTANEOUS BROADCAST OF AUDIO AND TRANSMISSION OF DOCUMENTS VIA PUSH TECHNOLOGY

FIELD OF THE INVENTION

The present invention relates to a system for holding simultaneous audio and document conferences, and more, particularly to a system in which both audio and document information may be broadcasted through a data network.

BACKGROUND OF THE INVENTION

Audio conferencing is used as a mechanism to conduct staff meetings, review documents, make presentations through visual slides, implement distance learning, etc. When an audio conference is held, parties strive to use the conference time as efficiently as possible. To use available conferencing time efficiently, copies of reports, documents, and presentations are distributed ahead of time by fax, e-mail, or courier. While it is a good practice to share information in advance of a scheduled conference call, it is possible to have situations where participants do not have time to review documents, do not get them because of an e-mail server going down, travel, vacation, short notice for a meeting, or the author of the documents does not have sufficient lead time to prepare the documents and share with others prior to the meeting time. Often times the business world experiences such situations and a lot of valuable time is lost in faxing or e-mailing the documents during the course of a meeting.

In most cases, audio conferencing is accomplished by systems that are based on either the traditional Public Switch Telephone Network (PSTN) or more recently, the Internet. Internet based audio conferencing products are available from a variety of vendors, one of which is NetSpeak, Inc. The product name in this case is WebPhone and this product may support multi-point audio conferencing over the Internet.

A variety of products currently exist for combining audio conferencing capabilities with functions incorporated into desktop computers. These features may include such things as application sharing, shared whiteboard's, chat, and file transfer. A significant limitation to running some of these functions may be that they require proprietary software in order to operate. For example, some of the current software will only run on certain platforms such as Windows 95 or Windows NT. The same software will not be compatible with Network Computers (NC) because NC is not a Window's based machine. Further problems may be encountered by those who wish to establish a telephonic connection over the worldwide web. In one situation in particular, users logged in through an Internet Service Provider (ISP) may not be able to call someone on a company's intranet because a firewall will not permit access.

SUMMARY OF THE INVENTION

The invention described herein is a system for transmission of document information during audio conferencing. Participants in the audio conference connect into a teleconferencing bridge either through the Public Switch Network or over a data network using IP telephony. The audio conferencing bridge is equipped with the capability to receive and transmit e-mail between the meeting participants. The user interface of each meeting attendee includes a web browser that has a plugin which provides a variety of functions. One function in particular is an HTML converter for documents. This converter will convert documents from a number of formats such as Microsoft Word, Word Perfect, etc., into HTML. This converter may also include the functionality to insert active hypertext links in the HTML documents that provide functionality which will be described in greater detail below.

When a party desires to hold an audio conference, the first step is to program into the audio conference bridge the scheduled time. At the time notice is provided to the potential attendees, an access code or a personal identification number may be distributed. Also included in the programming of the audio conference bridge may be an IP or e-mail address for the meeting leader. At the time that an audio conference is to be held, the participants call into the audio conference bridge. The telephonic connection may be established in a number of ways. In a first way, a meeting attendee calls in using a detached telephone over the Public Switch Telephone Network. The conference bridge is in direct connection with the PSTN and automated functions incorporated therein answer and provide the connection for the meeting attendees. In a second way, the attendees can establish audio communications through their user interface using IP telephony. The user interface includes the appropriate hardware and software for establishing audio communication over the data network. The conferencing bridge also includes a connection to the data network and is able to receive and process the IP telephony communications.

Once the conference attendees have connected to the bridge they may be required to enter their security or identification number. Once this is done, audio communication is established between the parties. During the time that the audio connection is established, the conference attendees may also be connected to the Internet using a web browser with an HTML converter plug in. At the time a conference attendee calls into the conferencing bridge, he or she also provides the IP address either to a live person who enters this information manually, or through touch tone into a e-mail processor. Once all this information is entered, the processor in the audio conferencing bridge compiles a list of all conference attendees including their IP addresses.

Each audio conference being processed through the bridge may have a party that is designated as a leader. From the leader will come the documents which are to be reviewed during the conference. Prior to transmission, these documents may be stored on the conference leader's user interface in a variety of different formats. Through a plug in incorporated into the leader's web browser, the documents may be converted to HTML language and presented on the leader's web browser. A number of icons with hypertext links may be incorporated into the document being displayed on the web browser. These icons allow a viewer of the document to perform a variety of functions. These functions may include transmitting a single page or an entire document to the conference attendees. Additional functionality may include moving forwards and backwards through documents that were received.

When the conference leader transmits a document to the other attendees, it is transmitted in the form of an e-mail to the conference bridge. The conference bridge is configured such that it has e-mail functionality and has connections to both the data network and the Public Switch Telephone Network. When the documents in the form of an e-mail are received by the bridge, the conference to which they are associated is first identified. It is possible that multiple conferences can be held over the same bridge. Once this identification is made, the list of attendees is retrieved from memory. At this point, the IP or e-mail addresses for all the attendees are identified and the documents (in HTML format) are extracted from the e-mail. Using PUSH technology, these pages and documents are delivered to the attendees almost instantaneously. The documents appear on the web browsers of the attendees in the same form in which they are transmitted, using the icon previously described. The attendees have the option to page through the documents received.

In the situation where other attendees of the meeting wish to transmit documents to the others, the leader designation may be transitioned to other attendees. The designated attendee merely needs to retrieve the document, use the HTML converter to convert the document to the appropriate format, and then transmit the information using the functionality incorporated into the icons on the web browser. When the conference then is completed, the attendees may disconnect from the bridge.

BRIEF DESCRIPTION OF THE DRAWINGS

FIG. 5 discloses an example list which may be created by the bridge which includes the names and IP addresses for the meeting attendees.

DESCRIPTION OF THE PREFERRED EMBODIMENTS

Figure 1:
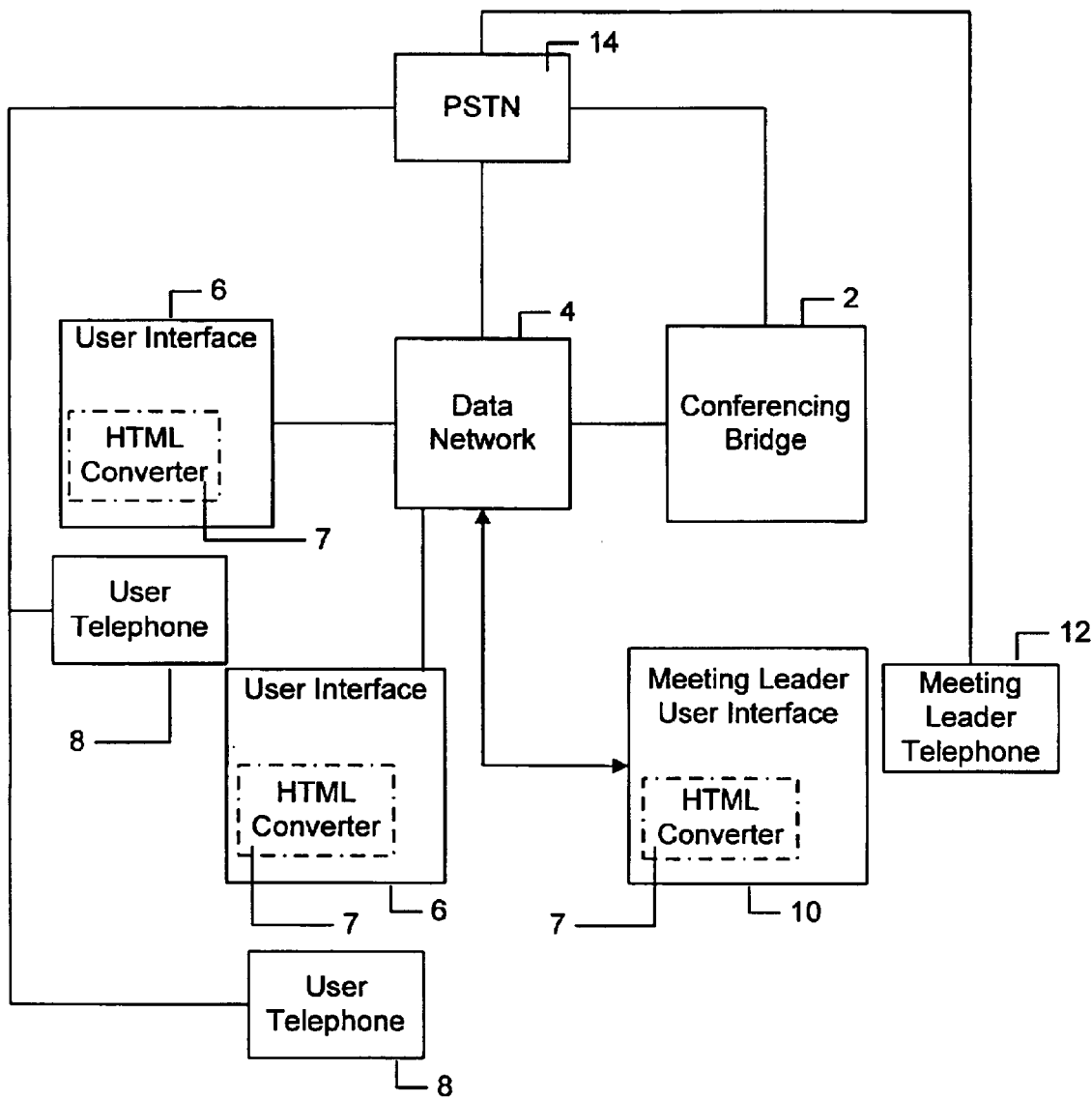
FIG. 1 is a system diagram for the conferencing system which incorporates the Public Switch Telephone Network (PSTN) and a data network such as the World Wide Web.

Disclosed in FIG. 1 is a system which provides audio/document conferencing for a plurality of conference attendees. The conference bridge 2 includes a number of dial-in ports which can be programmed to establish communications between the attendees that call in. In the invention described herein, the conference bridge includes the functionality to associate e-mail received over a data network with a particular audio conference which is being processed through the audio portion of the system. The conference bridge 2 can process audio communications which are received through the Public Switch Telephone Network (PSTN) 14 or via IP telephony. Also connected to the data network are a number of user interfaces 6. The conference attendees may be remotely located and establish connections to the data network through a number of means. Currently a number of Internet Service Providers (ISP) provide dial-up connections to the World Wide Web. In most cases, the interface is a personal computer which has a modem incorporated therein. Through the modem, the conference attendee establishes a telephonic connection to a network server provided by the ISP. Once a connection is established to the network server, the attendee has access to the data network. The attendees may also establish a connection to the data network through a local area network. In that case, the system user is connected to a local server which then has a direct connection to the data network.

The audio connection to the conference bridge 2 can be established in a number of ways. In a first way, the conference attendee uses a telephone to establish a connection to the bridge over the PSTN. Prior to the conference each attendee is given a bridge number, as well as identification or security number, in order to gain access to the conference. Once the connection to the bridge is established, the conference attendee is requested to enter the identification or security. During this connection procedure, the user may also be asked to provide a variety of different forms of information in order to facilitate the establishment of the conference. This will be described in greater detail below.

An audio connection through the bridge may also be established using IP telephony. In this type of connection, the workstation of the conference attendee includes hardware and software for establishing an audio connection over the data network. The hardware may include a microphone and speakers. The software is of the type which converts audio data and transmits it over the data network. This IP telephony connection may be established directly through the data network from the user interface to the conference bridge, or in another configuration the network may include the ability to establish a telephonic connection over the PSTN which then provides the audio connection to the conference bridge.

The audio conference which is established over the conference bridge may have a meeting leader. The meeting leader will in most cases have the same type of interface devices that the other attendees do. This includes a user interface 10 and a telephone 12. In other situations, it is possible that the meeting leader may have a direct connection to the conference bridge for both the telephone and the user interface.

The system described herein provides the unique ability to hold an audio/document conference through a conference bridge without the necessity of the meeting attendees all having compatible software. In many audio conferences, it is necessary that the attendees have copies of documents which are going to be discussed during the meeting. In the past, these documents were routed to the attendees either through regular mail, fax, e-mail, or courier. In the system described herein, it is possible to route documents to the attendees during the meeting such that they may be viewed during discussions. The system includes the capability for all members to receive and transmit entire documents or to transmit information a page at a time.

Figure 2:
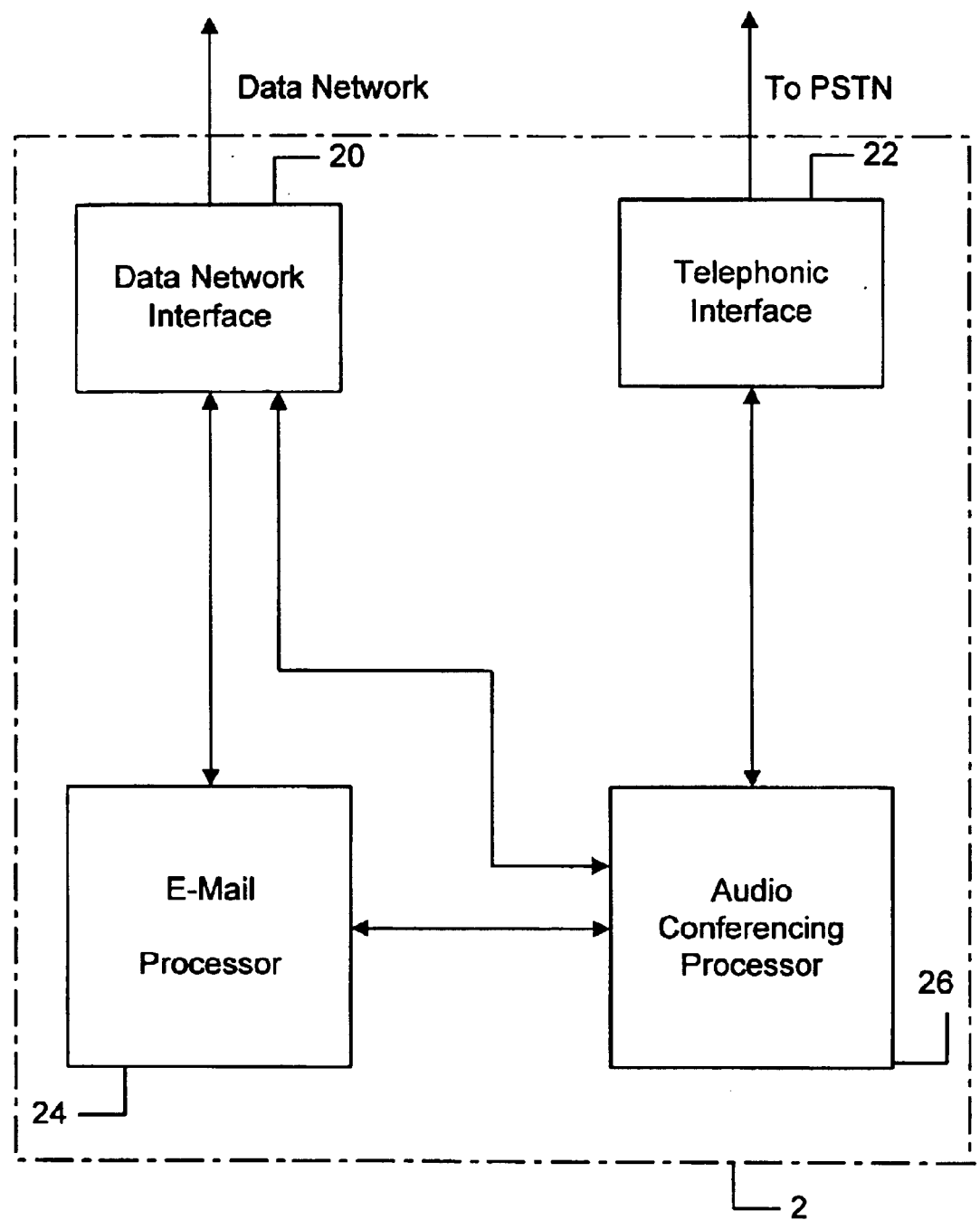
FIG. 2 is a system diagram for the conferencing bridge.

Disclosed in FIG. 2 is a system diagram for the conferencing bridge 2. The conferencing bridge has external connections to both the data network and the PSTN. Incorporated into this bridge are a data network interface 20 as well as a telephonic interface 22. Both these interfaces include the necessary components to receive and transmit information over these mediums. Connected to both the data network interface and the telephonic interface is audio conferencing processor 26. This processor controls all of the internal functions for the bridge. Some of these internal functions include the establishment of a conference call when calls are placed to the bridge, the processing of audio information for the conference, the processing of document information received via e-mail from the data network and transmission of e-mail which contain document information over the data network. Additional functionality incorporated into the audio conferencing processor is the ability to process IP telephony information. As was described above, phone calls can be placed to the audio conference bridge in order to establish conference calls both over the data network and through the PSTN. Also in contact with the audio conferencing processor and the data network interface is e-mail processor 24. The e-mail processor handles receipt and transmission over the data network of E-mail messages which contain document information.

In operation, a teleconference must first be scheduled to be held using the conferencing bridge 2. A bridge number is given to all parties that will attend the conference as well as a time for when the conference will be held. Also, if the bridge is large and sophisticated enough to handle multiple conference calls, or security is an issue, a personal identification number (PIN) may be issued to all parties who will attend the conference. The meeting leader will also receive an e-mail address of the audio conferencing bridge. He or she would then set up the audio conferencing browser plugin with this e-mail address before the conference starts.

When it is time to hold the conference, each attendee calls into the bridge at the appropriate time and provides all necessary information in order to establish a connection. The attendees may establish contact with the conferencing bridge through either the Public Switch Telephone Network on a telephone line detached from the personal computer, or through the use of IP telephony over the data network. In the invention described herein, the meeting attendees will also be required to provide an IP address so that during the meeting, documents may be received and transmitted by the attendees.

During the time that all the attendees are calling into the bridge, the audio conferencing processor will compile a list of meeting attendees. The list will include the IP address for each attendee. While each attendee is connected into the conferencing bridge, they will have access to a workstation with a data network connection. Incorporated into the meeting leader's web browser, and possibly all the user interfaces of the attendees, is a HTML converter plug-in. This plug-in includes the functionality to convert documents from a known word processing or database format into HTML language. The converter will also include a number of icons on each page of the document, which when selected performs a number of functions which include paging through the document, transmitting a single page of the document, or transmission of the entire document over the data network to the meeting attendees.

Throughout the meeting, the meeting leader may transmit documents via the e-mail processor in the conferencing bridge to each of the attendees. The PUSH technology incorporated into the e-mail processor provides for nearly instantaneous transmission of the documents. Once the document is converted to HTML by the web browser plugin on the meeting leader's desktop and sent to the audio conferencing bridge as an e-mail, the PUSH technology recreates the web page on each attendees' browser. The same icons which were on the meeting leader's web page also appear on each of the attendee's received pages so that during the meeting they may page either backwards or forwards through the document. If the attendees also have the HTML converter plug-in incorporated into their web browser, they may also transmit documents to the other attendees in the same fashion as the meeting leader.

Figure 3:
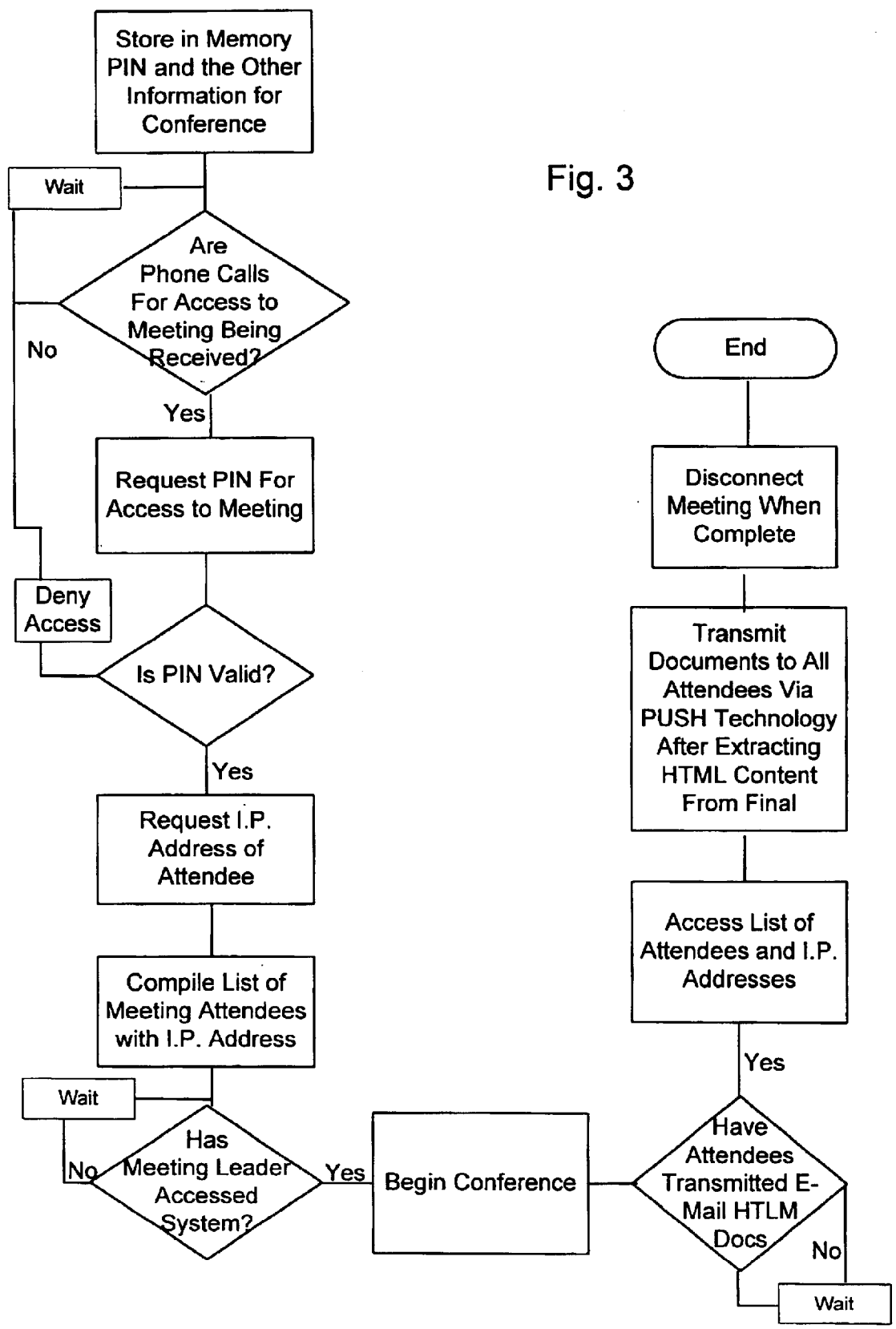
FIG. 3 is a flow chart which describes the functions carried out during a conference.

Disclosed in FIG. 3 is a flow chart which describes in detail the processes performed by the conferencing bridge 26 prior to and during a conference call. Initially, the conferencing bridge detects the incoming phone calls of the attendees through either the PSTN or via IP telephony over the data network. At the time a connection is established with the attendees, a query to each attendee will request that a identification number be entered to gain access to the meeting. The processor will perform an analysis of the identification number, and if the number is invalid access to the meeting will be denied. If the number is valid, access is granted and a further query is made of each attendee to provide an IP address to which documents may be transmitted during the meeting. During the time that each of the attendees are calling into the bridge, the audio conferencing processor will compile a list of attendees and their associated IP addresses. An example of such a list is disclosed in FIG. 5. As can be seen in the table, each name is directly associated with an IP address, and the processor uses this address in order to facilitate the transmission of documents to be viewed by the conference attendees.

As described above, each meeting may include a meeting leader. The system will check to establish that the meeting leader is in attendance before beginning the conference call. Once this has been established, the conference is ready to start. During the time that the meeting is occurring, any of the meeting attendees may wish to transmit a document to the other attendees. Once the documents are retrieved, the plugin in each of the attendee's web browsers will convert the document from its previous format into an HTML document. At this point the attendee will transmit this web page via an e-mail to the conference bridge, and more specifically, the e-mail processor 24. Once the bridge detects that an e-mail has been received, the list of attendees is accessed, and using the IP addresses for each attendee incorporated therein, a message is prepared for transmission using PUSH technology. The e-mail processor then transmits the HTML documents to all of the attendees via the data network. When the attendees receive the document they are able to view them using their web browsers.

Figure 4:
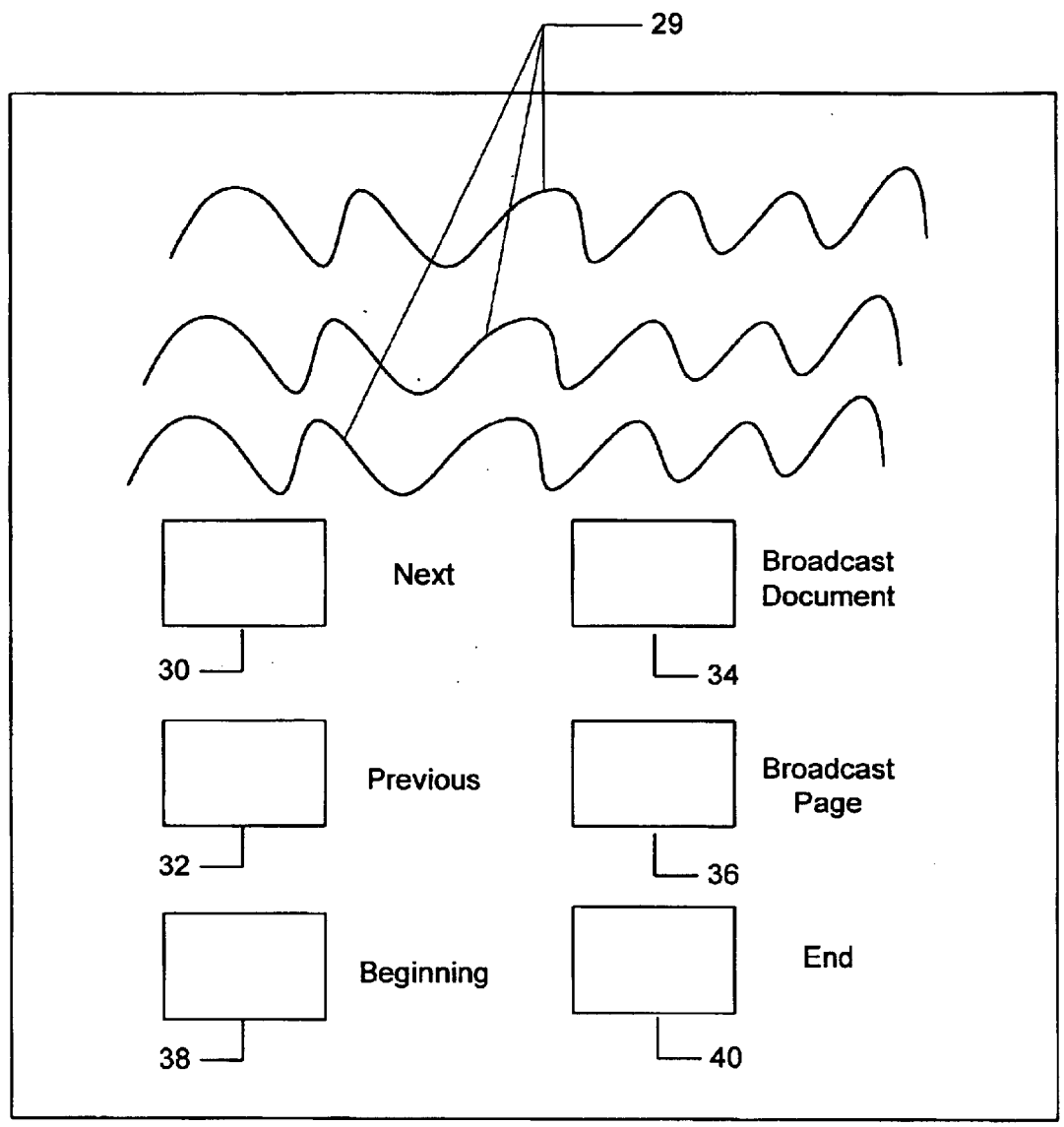
FIG. 4 discloses an example of a converted document which would appear on a attendee's web browser which includes icons for performing various functions.

Provided in the document is the functionality to browse forwards or backwards. Disclosed in FIG. 4 is an example of a document as it would appear on a web browser page. In the example shown, the Text 29 of the document fills the upper portion of the page. At the bottom of the page are a series of icons which provide the functionality. The "Next" icon 30 when selected allows the attendee to view the next page in the document. The "Previous" icon 32 allows the attendee to move through the pages which have been received. Other icons which may be included on the page are a "End" icon 40 and a "Beginning" icon 38 which would allow the attendee to go to the end or beginning of a document merely by selecting the particular icon. Other icons that are included on the page are the "Broadcast Document" icon 34 and the "Broadcast Page" icon 36. These two icons allow the user to broadcast an entire document or just the current page being viewed to all the other attendees of the meeting. As was described above, when this icon is selected the document, or just the page being viewed is transmitted to the e-mail processor of the conference bridge, where it is then further transmitted to the attendees of the meeting.

The present invention may work in the same fashion when another attendee wants to act as a leader, where attendees can take turns to broadcast their respective materials at the appropriate times. For those joining the bridge at a later time, the bridge can be enhanced to queue all the e-mails received from the sender(s) in the order received and send them when such people join the bridge. Once a document or the pages are received on their respective desktops, the attendees can then use the back and forward buttons on the browsers to navigate through them. It should be noted that the attendees can have features such as shared clipboard and web chat by using copy/cut/paste functions to create a web page on the fly from other documents. The only requirement is that the "Broadcast Page" icon is included at the end of the page to broadcast the page to other attendees.

In the event that multiple conference bridges are required because of limited availability of ports in the audio conference bridge, the agency which controls the bridge will assign a bridge number and e-mail address per bridge. The web browser menu option will allow setting up of the bridge number and an e-mail address pair per bridge. Moreover, the plug-in will be enhanced to transmit the e-mail messages to all bridges and to broadcast the message to all attendees present on the different conferencing bridges.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of holding an electronic conference comprising the steps of:
    a plurality of conference attendees establishing a connection with a conference bridge through a data network;
    compiling a list of Internet Protocol (IP) addresses of the plurality of conference attendees;
    identifying a conference leader connected to the conference bridge through a user interface;
    establishing an audio connection between the conference leader and the conference attendees over the audio connection with the conference bridge;
    upon the selection of the conference leader, receiving at an email processor incorporated in the conference bridge at least one email from the conference leader which includes at least one electronic document converted to HTML format; and
    accessing the IP addresses of the conference attendees from the compiled list and recreating, in response to the at least one email from the conference leader, the HTML document on a web browser associated with each of the IP addresses of the plurality of conference attendees using PUSH technology.

2. The method of claim 1 wherein the audio connection is through IP telephony over the data network.

3. The method of claim 1 wherein at least one electronic document converted to HTML format includes icons which the conference leader may activate to transmit an entire one of the at least one electronic document converted to HTML format or just a single page thereof.

4. The method of claim 1 wherein any of conference attendees may become the conference leader and convert and email electronic documents to the email processor so that they may be recreated on the web browsers of the other conference attendees.

5. The method of claim 1 wherein the IP addresses for the conference attendees may be entered through touch tone signals.

6. The method of claim 1 wherein the at least one electronic document converted to HTML format are queued and provided to the conference attendees as they establish contact with the conference bridge.

7. The method of claim 1 wherein the connection is established with a plurality of the conference bridges.

8. A conferencing system comprising:
    an audio conferencing processor connectable to a public switched telephone network which provides for establishment of audio communications between a plurality of remotely located system users, wherein one of the remotely located system users is identified as a conference leader, the audio conferencing processor compiling a list of Internet Protocol (IP) addresses of the plurality of remotely located system users; and
    an email processor connectable to a data network which is configured to receive at least one email which includes at least one HTML document from the conference leader and to recreate the at least one HTML document on a web browser at the IP address for each of the plurality of remotely located system users using PUSH technology.

9. The system of claim 8 wherein the audio communications are established through IP telephony over the data network.

10. The system of claim 8 wherein the data network is the Internet.

11. The system of claim 8 wherein the system includes a processing module to receive and process at least one reply e-mail from at least one of the plurality of remotely located system users.

12. The system of claim 11 wherein the processing module stores all the reply e-mail received and recreates any documents included in the reply e-mail on the web browser at the IP addresses for each of the plurality of remotely located system users using PUSH technology.

13. The system of claim 11 wherein a plurality of the audio conferencing processors and email processors are included for the establishment of audio communications and the transmission of documents to the plurality of remotely located system users.

* * * * *